(12) United States Patent
Duksta et al.

(10) Patent No.: US 11,079,757 B1
(45) Date of Patent: Aug. 3, 2021

(54) UNMANNED AERIAL VEHICLES TO SURVEY LOCATIONS AND COLLECT DATA ABOUT DIFFERENT SIGNAL SOURCES

(71) Applicant: Amazon Technologies, Inc., Seattle, WA (US)

(72) Inventors: John Clark Coonley Duksta, Seattle, WA (US); Skylar Jade Hensel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 613 days.

(21) Appl. No.: 15/818,572

(22) Filed: Nov. 20, 2017

(51) Int. Cl.
| | | |
|---|---|---|
| *G05D 1/00* | (2006.01) | |
| *B64C 39/02* | (2006.01) | |
| *G06Q 50/28* | (2012.01) | |

(52) U.S. Cl.
CPC ......... *G05D 1/0088* (2013.01); *B64C 39/024* (2013.01); *B64C 2201/128* (2013.01); *B64C 2201/141* (2013.01); *G06Q 50/28* (2013.01)

(58) Field of Classification Search
CPC ...... G05D 1/0088; G05D 1/00; B64C 39/024; B64C 2201/128; B64C 2201/141; B64C 39/02; G06Q 50/28; B60W 60/00; B60W 60/00188; G08G 5/0004; G08G 5/0008; G08G 5/0039; G08G 5/0069; H04W 24/00; H04W 24/02; H04W 84/18
See application file for complete search history.

(56) References Cited

U.S. PATENT DOCUMENTS

| | | | | |
|---|---|---|---|---|
| 5,923,286 A | * | 7/1999 | Divakaruni | G01S 19/20 |
| | | | | 342/357.44 |
| 7,984,500 B1 | * | 7/2011 | Khanna | G06F 21/60 |
| | | | | 726/22 |
| 8,446,310 B2 | * | 5/2013 | Law | G01S 19/21 |
| | | | | 342/16 |
| 8,813,186 B2 | * | 8/2014 | Hegg | H04L 63/0876 |
| | | | | 726/2 |
| 8,838,289 B2 | * | 9/2014 | Margolin | G05D 1/0044 |
| | | | | 701/2 |

(Continued)

OTHER PUBLICATIONS

SRLabs Open Source Projects, "SnoopSnitch," downloaded from https://opensource.srlabs.de/projects/snoopsnitch on Nov. 6, 2017, 3 pages.

*Primary Examiner* — Angelina Shudy
(74) *Attorney, Agent, or Firm* — Lee & Hayes, P.C.

(57) ABSTRACT

One or more UAVs may survey signal sources encountered during execution of flight plans. A UAV may identify a signal source and determine attributes about the signal source. The attributes may include a location, an identifier, a signal/network type, a signal strength, and/or other information about the signal or signal source. Some attributes may be supplied by the signal source and other attributes may be assigned by another source that received signals from the signal source. The signal source may be associated with a trust level or trust designation (e.g., trusted, not trusted, unknown, etc.). An example of an untrusted signal source is a rogue signal source. A signal source may be labeled as untrusted or have a designation of unknown trust level based on application of one or more rules. Survey results and attributes may be compiled and made available for use by other parties.

20 Claims, 8 Drawing Sheets

(56) References Cited

U.S. PATENT DOCUMENTS

| | | | | |
|---|---|---|---|---|
| 8,972,166 | B2* | 3/2015 | Donovan | G08G 1/096844 |
| | | | | 701/408 |
| 9,097,529 | B2* | 8/2015 | Shehi | G01C 23/00 |
| 9,273,982 | B2* | 3/2016 | Shanishchara | G01C 25/00 |
| 9,398,467 | B2* | 7/2016 | Schultz | H04W 48/18 |
| 9,412,278 | B1* | 8/2016 | Gong | G08G 5/0091 |
| 9,465,388 | B1* | 10/2016 | Fairfield | G05D 1/0044 |
| 9,467,922 | B1 | 10/2016 | Buchmueller et al. | |
| 9,646,502 | B1* | 5/2017 | Gentry | G08G 5/0013 |
| 9,658,341 | B2* | 5/2017 | Mathews | G01S 5/021 |
| 9,715,235 | B2* | 7/2017 | McGrew | G05D 1/0044 |
| 9,805,273 | B1* | 10/2017 | Seeber | H04R 29/00 |
| 9,821,910 | B1* | 11/2017 | Suiter | G01C 23/005 |
| 10,192,451 | B2* | 1/2019 | Foina | G08G 5/0026 |
| 10,365,645 | B1* | 7/2019 | Chambers | B64C 39/024 |
| 10,386,202 | B2* | 8/2019 | Aucoin | G01C 25/00 |
| 10,403,153 | B2* | 9/2019 | Glaab | G05D 1/0055 |
| 10,453,348 | B2* | 10/2019 | Speasl | B64F 1/222 |
| 10,498,883 | B1* | 12/2019 | Krebs | G10L 15/26 |
| 10,642,284 | B1* | 5/2020 | Barazovsky | G01S 19/45 |
| 10,657,831 | B2* | 5/2020 | Russell | H04W 4/44 |
| 10,666,767 | B1* | 5/2020 | Floyd | G05D 1/0088 |
| 10,703,478 | B2* | 7/2020 | Hunt | H04L 9/3247 |
| 10,725,139 | B1* | 7/2020 | Duksta | G01S 5/0242 |
| 10,773,381 | B2* | 9/2020 | Husain | B25J 9/1674 |
| 10,825,345 | B2* | 11/2020 | Sugahara | H04W 4/40 |
| 10,839,336 | B2* | 11/2020 | Greiner | B64D 1/02 |
| 2012/0192251 | A1* | 7/2012 | Faiman | G06F 21/554 |
| | | | | 726/3 |
| 2015/0370253 | A1* | 12/2015 | Gurin | H04N 7/185 |
| | | | | 701/23 |
| 2016/0068264 | A1* | 3/2016 | Ganesh | B64C 39/024 |
| | | | | 701/2 |
| 2016/0073271 | A1* | 3/2016 | Schultz | H04L 63/105 |
| | | | | 455/404.1 |
| 2016/0225264 | A1* | 8/2016 | Taveira | G08G 5/0013 |
| 2016/0253907 | A1* | 9/2016 | Taveira | G07B 15/00 |
| | | | | 701/3 |
| 2016/0280370 | A1* | 9/2016 | Canavor | H04W 12/0609 |
| 2016/0285863 | A1* | 9/2016 | Canavor | H04L 63/123 |
| 2017/0006417 | A1* | 1/2017 | Canoy | H04B 7/18506 |
| 2017/0132943 | A1* | 5/2017 | Moon | G08G 5/0039 |
| 2017/0187993 | A1* | 6/2017 | Martch | G01S 1/00 |
| 2017/0200379 | A1* | 7/2017 | Rizzi | G01S 19/16 |
| 2017/0234966 | A1* | 8/2017 | Naguib | G01S 5/22 |
| | | | | 367/117 |
| 2017/0337826 | A1* | 11/2017 | Moran | G05D 1/0088 |
| 2017/0357273 | A1* | 12/2017 | Michini | G05D 1/106 |
| 2017/0369183 | A1* | 12/2017 | Tarimala | G08G 5/0069 |
| 2018/0039838 | A1* | 2/2018 | Chan | G08G 5/0043 |
| 2018/0086451 | A1* | 3/2018 | Vaughn | G08G 5/0069 |
| 2018/0111683 | A1* | 4/2018 | Di Benedetto | G06Q 30/04 |
| 2018/0128895 | A1* | 5/2018 | Seeber | G08G 5/0026 |
| 2018/0155011 | A1* | 6/2018 | Greiner | B64D 1/22 |
| 2018/0238709 | A1* | 8/2018 | Aucoin | G01S 19/48 |
| 2018/0279105 | A1* | 9/2018 | Huber | H04W 76/50 |
| 2018/0281946 | A1* | 10/2018 | Obaidi | G08G 5/0082 |
| 2018/0284773 | A1* | 10/2018 | Pratt | G05D 1/0094 |
| 2019/0004512 | A1* | 1/2019 | Liu | G06F 21/44 |
| 2019/0020404 | A1* | 1/2019 | Russell | H04B 7/18506 |
| 2019/0066047 | A1* | 2/2019 | O'Brien | B64C 39/024 |
| 2019/0066488 | A1* | 2/2019 | Locke | G08B 25/10 |
| 2019/0068582 | A1* | 2/2019 | Kim | G07C 5/008 |
| 2019/0103030 | A1* | 4/2019 | Banga | G08G 5/0013 |
| 2019/0114925 | A1* | 4/2019 | Schulman | G06F 21/31 |
| 2019/0199534 | A1* | 6/2019 | Beaman | B64D 1/00 |
| 2019/0232990 | A1* | 8/2019 | Moennich | B61L 23/042 |
| 2019/0278897 | A1* | 9/2019 | Zhang | G06Q 50/30 |
| 2019/0371341 | A1* | 12/2019 | Schwindt | G06F 21/32 |
| 2019/0386986 | A1* | 12/2019 | O'Brien | G05D 1/0225 |
| 2020/0013243 | A1* | 1/2020 | Nicholls | G07C 5/0816 |
| 2020/0014759 | A1* | 1/2020 | Wunderlich | G06Q 10/0635 |
| 2020/0036742 | A1* | 1/2020 | Casella | H04L 41/0816 |
| 2020/0043348 | A1* | 2/2020 | Ghosh | G05D 1/101 |
| 2020/0104501 | A1* | 4/2020 | McNair | G06F 21/57 |
| 2020/0341492 | A1* | 10/2020 | Thomassey | G05D 1/101 |
| 2020/0361480 | A1* | 11/2020 | Rodriguez Bravo | B60W 50/14 |

* cited by examiner

UNMANNED AERIAL VEHICLES TO SURVEY LOCATIONS AND COLLECT DATA ABOUT DIFFERENT SIGNAL SOURCES

BACKGROUND

Unmanned aerial vehicles (UAVs) vary in degrees of sophistication. For example, a class of UAVs used by hobbyists often rely completely on receipt of control signals from a user-operated remote control device. This class of UAVs relies on user input to provide most or all navigational instructions. A more advanced class of UAVs may exchange control signals and/or other data via established signal sources such as mobile telephone towers. This class of UAVs may receive high level instructions such as waypoints, a destination, and/or other parameters, and may implement logic to navigate through airspace based on the high level instructions and other information accessed by sensors on the UAVs and/or information obtained from the established signal sources. A command station may exchange data with a UAV using a mobile telephone network or other established signal source to exchange information, log events, and for other reasons.

Not all signal sources are trustworthy and well suited for communication by UAVs. For example, some signal sources may be International Mobile Subscriber Identity (IMSI) catchers and/or rogue signal sources used for malicious purposes or other undesirable purposes. Some signal sources may expose data to untrusted sources, may provide untrusted data to the UAVs, be unreliable, and/or may otherwise be undesirable for use in data transfer by a UAV.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
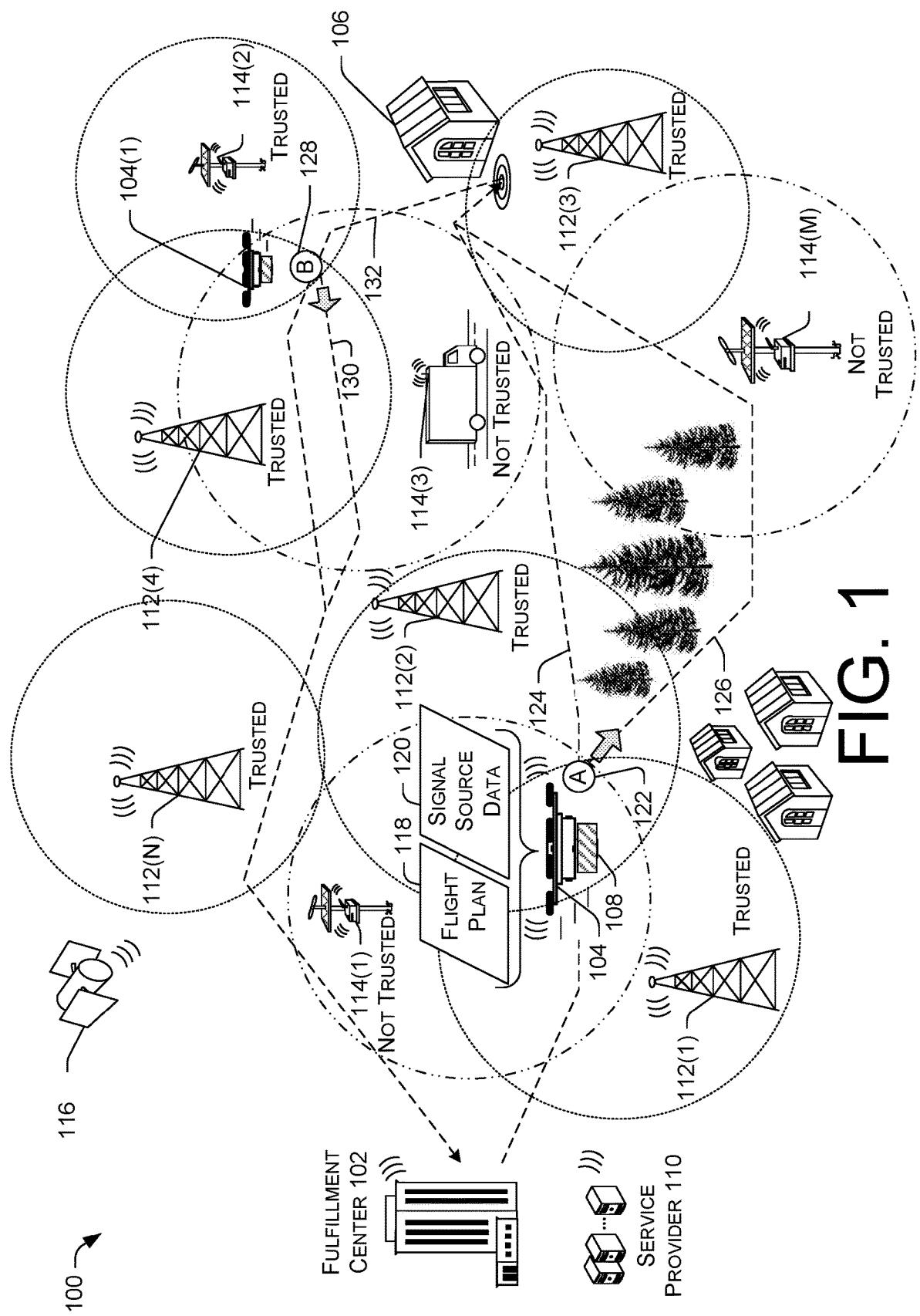
FIG. 1 is a schematic diagram of an illustrative environment that includes an unmanned aerial vehicle (UAV) interacting with various signal sources while executing a flight plan, where at least one signal source is an untrusted signal source.

This disclosure is directed at least partly to collection and use of signal source data, which includes information about network towers and/or other signal sources encountered by an unmanned aerial vehicle (UAV) during execution of a flight plan. The UAV may be used to deliver packages to customers, among other possible tasks performed by UAVs.

In some embodiments, a UAV may survey signal sources encountered during execution of at least part of a flight plan. The UAV may identify a signal source and determine attributes about the signal source. The attributes may include a location (e.g., coordinates, latitude/longitude, etc.) of a signal source, an identifier (ID), signal metadata, a signal strength, and/or other information about the signal or signal source. The signal metadata may include a frequency, a channel, a radio access technology (RAT) designation, identification parameter(s), and/or other information received from the signal source. While some of the attributes may be supplied by the signal source, other attributes may be assigned by a UAV or other source that received signals from the signal source. In various embodiments, the signal source may be associated with a trust level or trust designation (e.g., trusted, not trusted, unknown, etc.). Some signal sources may be included in a whitelist and indicated as trusted sources, which may be generated at least in part by a service provider and/or operators of networks, such as telecommunications providers, industry groups, and/or other trusted parties. Some signal sources may be included in a blacklist and indicated as untrusted, which may be generated by at least in part by a service provider based on information collected by UAV during surveying of signal sources and possibly using other information. An example of an untrusted signal source is a rogue signal source, such as an International Mobile Subscriber Identity (IMSI) catcher. In some embodiments, a signal source may be labeled as untrusted or have a designation of unknown trust level based on application of one or more rules. For example, an example rule may be applied that a signal source is not trusted until the signal source has been detected with same attributes (e.g., same or similar signal attributes, location, etc.) for a predetermined amount of time (e.g., a certain number of days, weeks, or months). Another example rule may designate a signal source as trusted after authentication with the signal source using a specified authentication process.

A flight plan may be created by a service provider (e.g., a central command), by the UAV, and/or based on direct or indirect input from other entities or national conditions (e.g., weather). The flight plan may include a first flight path to a first destination and a second flight path to a second destination, where the second destination may be both a location of origin and termination of the flight. The second flight path may be different than the first flight path, and may be selected based on known locations of signal sources or a lack thereof. For example, a flight path may be selected to cause a UAV to fly over or near coordinates of an untrusted signal source to survey the untrusted signal source to determine whether the untrusted source is still present and active. As another example, the flight path may be selected to cause a UAV to fly over an area not previously surveyed or not surveyed since passage of a predetermined amount of time, which may enable obtaining new survey data or refreshing stale and old survey data.

Upon encountering an untrusted signal source, a UAV may select different actions to perform to avoid exchanging data with the untrusted source. In some embodiments, the UAV may refrain from connecting to the untrusted signal source, such as by causing a transceiver to refrain from selecting the untrusted signal source for communication. This approach may work when the UAV is capable of selecting networks and/or signal sources for the communication, such as when the signal source is a second generation (2G) network or a third generation (3G) network. In various embodiments, the UAV may refrain from reporting the untrusted signal source as accessible, such as when the transmitter provides signal information to signal sources, which select the signal source for communication with the transceiver, such as with a fourth generation (4G) network. By refraining from reporting the untrusted signal source, the 4G network will not be able to assign the untrusted signal source for use by the transceiver of the UAV. In accordance with some embodiments, the UAV may refrain from communications until a later point in time, such as when the untrusted signal source is out of range and/or another trusted signal source is within range of the UAV. For example, the UAV may have to fly without exchanging data with a signal source for a certain distance away from the untrusted signal source.

The techniques, UAVs, and systems described herein may be implemented in a number of ways. Example implementations are provided below with reference to the following figures.

FIG. 1 is a schematic diagram of an illustrative environment 100 that includes an unmanned aerial vehicle (UAV) interacting with various signal sources while executing a flight plan, where at least one signal source is an untrusted signal source. The environment 100 may include a fulfillment center (FC) 102 where a UAV 104 may originate a flight directed to a destination 106, such as a location associated with a recipient of a package (or item) 108 transported by the UAV 104. The UAV 104 may receive some flight information and/or commands from a service provider 110, which operate as a central command among other tasks performed and described below. The service provider 110 may communicate with the UAV 104 via one or more wireless network(s), such as a network that utilizes different signal sources. The signal sources may be from traditional mobile telephone towers (antennas), ad hoc antennas, satellites, and/or other sources described herein. The signal sources may support virtually any time of wireless protocol, including mobile telephone protocols, Wi-Fi protocols, long-range wireless protocols, and so forth. The UAV 104 may also, at times, conduct autonomous flight, such as during intervals between communications from the service provider 110 and/or when communication with the service provider 110 is not available. The service provider 110 may create and/or maintain a signal source data repository that may include various information about signal sources that have been by UAVs and may be encountered by the UAV 104 during execution of the flight or other flights.

The signal sources may include conventional signal sources 112(1)-(N), nonconventional signal sources 114(1)-(M), satellites 116, and possibly other signal sources. The satellites 116 may be used primarily for supplying global positioning system (GPS) data to the UAVs and/or other devices. The conventional signal sources 112(1)-(N) may include mobile telephone antennas and other sources determined to be controlled by trusted third parties. The conventional signal sources 112(1)-(N) may operate using certain signal or network protocols, such second generation (2G), third generation (3G), fourth generation (4G), or other generation mobile network protocols. The nonconventional signal sources 114(1)-(M) may be operated by unknown entities and/or by entities other than the trusted third parties. At least one of the nonconventional signal sources 114(1)-(M) may be a rogue signal source that is an untrusted source. Other individual signal sources of the nonconventional signal sources 114(1)-(M) may be untrusted or may be yet to be designated as trusted sources (e.g., subject to rules such as a duration of use rule). For example, the nonconventional signal sources 114(1), 114(3), and 114(M) may ultimately be untrusted sources; however, they may not be known by the service provider 110 until later discovery by the UAV 104 during a flight. Each signal source may include a boundary/zone in which the signal can be received. Illustrative boundaries are shown in FIG. 1, but are not necessarily to scale. In many situations, geographic regions may include substantial coverage or access to signal sources, and many locations may have access to multiple overlapping signal sources.

The UAV 104 may include a flight plan 118, which may be initially created by the service provider 110 and/or by the UAV 104 prior to flight of the UAV 104. The flight plan 118 is stored in memory of the UAV 104 and causes the UAV to fly to the destination 106, such as by traveling through waypoints tracked by a global positioning system (GPS) receiver of the UAV. Meanwhile a flight path may be the actual path or approximate path between particular waypoints. The flight plan 118 may include altitude information, and thus may be three-dimensional. For example, a flight plan may be created to cause a UAV to fly at a certain altitude over or near certain signal sources, as well as around other signal sources or obstacles depending on flight capabilities of the UAV and other possible constraints.

At least some data from the signal source data repository may be provided to the UAV 104 and stored as signal source data 120. The signal source data may include location information (e.g., latitude/longitude, etc.), signal metadata, a trust designation, and/or other information about individual signal sources that are currently known or where known in the past. The data (or other data) may be modified or created to add discovery of new signal sources and attributes about those new signal sources. Thus, during flight, the UAV 104 may collect information (e.g. attributes) about signal sources that are available for use by a transceiver on board the UAV 104.

The UAV 104 may execute the flight plan 118 that causes the UAV 104 to travel to a first waypoint "A" 122. At the first waypoint 122, the UAV may detect a first conventional signal source 112(1), a second conventional signal source 112(2), and first nonconventional signal source 114(1). The signal source data 120 may include information about at least the first conventional signal source 112(1) and the second conventional signal source 112(2), which designate these sources as trusted and permit the UAV to exchange data via these signal sources. However, the first nonconventional signal source 114(1) may be designated as untrusted or unknown. The UAV 104 may refrain from exchanging information with the first nonconventional signal source 114(1) at least until the first nonconventional signal source 114(1) is designated as trusted. In some embodiments, the first nonconventional signal source 114(1) may be determined to be untrusted based on (i) inclusion in a blacklist, (ii) lack of inclusion in a whitelist, and/or for other reasons.

At or prior to arriving at the waypoint A 122, the UAV 104 may update the flight plan (or create a new flight plan) to determine how best to travel to the next waypoint or the destination 106 based on availability and/or attributes of signal sources in a region. For example, the flight plan 118 may, before an update, direct the UAV 104 along a route 124.

However, based on knowledge of certain signal sources, UAV 104 may be directed along a route 126. In some embodiments, the UAV 104 may be directed along the route 126 by a flight controller without necessarily updating a flight plan or all waypoints of the flight plan. The route 126 may be selected based on factors such as attributes of signal sources located along the route 126, among other considerations. For example, the UAV 104 may fly along the route 126 to inspect specific signal sources such as a nonconventional signal source 114(M) that may be relatively new, and may yet to be designated as trusted based on application of rules that require a signal source to be active a threshold amount of time before being designated as trusted (among other possible criteria and/or rules). By flying near the nonconventional signal source 114(M), the UAV 104 may determine whether the nonconventional signal source 114(M) is still active and, if so, may log or otherwise store attributes about the nonconventional signal source 114(M). If application of the rules permit the UAV to exchange data with the nonconventional signal source 114(M), then the UAV may exchange data with the nonconventional signal source 114(M). Otherwise, the UAV may refrain from exchanging data with the nonconventional signal source 114(M) because the nonconventional signal source 114(M) is currently designated as being untrusted. In some embodiments, the UAV may fly without connectivity to a signal source, for at least a short distance until regaining connectivity via a trusted signal source.

As another example, the UAV 104, at or prior to a second waypoint "B" 128, may select a route 130 instead of a route 132 to survey airspace that has not be surveyed or has not be surveyed since passage of a predetermined amount of time. As the UAV 104(1) (shown at the second waypoint 128) traverses the route 130, the UAV, via a transceiver, may detect a second nonconventional signal source 114(2), a third nonconventional signal source 114(3), and a fourth conventional signal source 114(4), among other possible signal sources. The UAV may collect attribute information about the various signal sources to populate the signal source data 120 and/or to send to the service provider 110 to populate the signal source data repository. The UAV 104(1) may determine that the third nonconventional signal source 114(3) is an untrusted signal source, and possibly a rogue signal source based at least in part on the signal source data.

Figure 2:
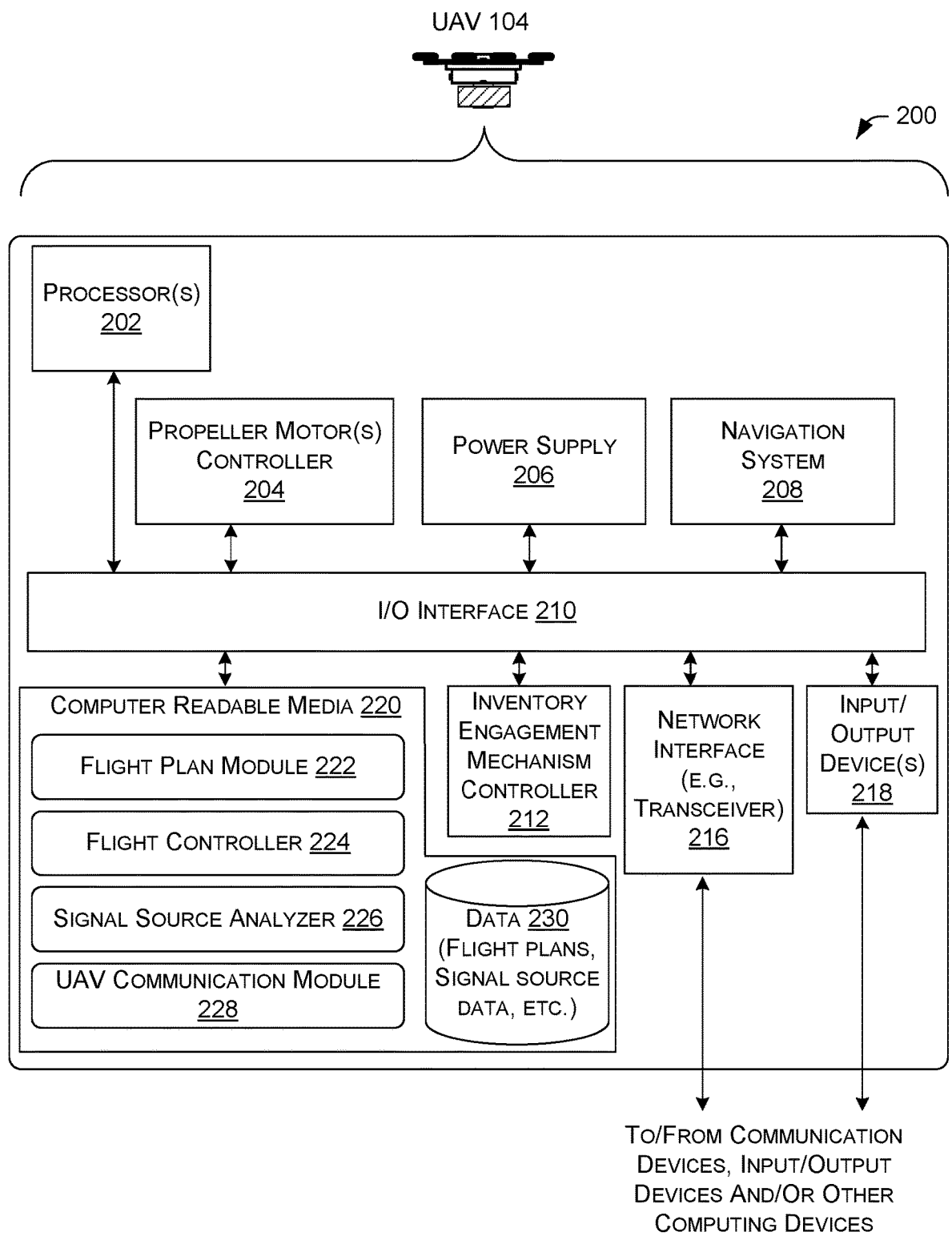
FIG. 2 is a block diagram of an illustrative UAV architecture.

FIG. 2 is a block diagram of an illustrative UAV architecture 200 of the UAV 104. The UAV architecture 200 may be used to implement the various systems, devices, and techniques discussed above. In the illustrated implementation, the UAV architecture 200 includes one or more processors 202, coupled to a non-transitory computer readable media 220 via an input/output (I/O) interface 210. The UAV architecture 200 may also include a propeller motor controller 204, power supply module 206 and/or a navigation system 208. The UAV architecture 200 further includes an inventory engagement mechanism controller 212, a network interface 216, and one or more input/output devices 218.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 220 may be configured to store executable instructions/modules, data, flight paths, and/or data items accessible by the processor(s) 202. In various implementations, the non-transitory computer readable media 220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 220 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 216.

In one implementation, the I/O interface 210 may be configured to coordinate I/O traffic between the processor(s) 202, the non-transitory computer readable media 220, and any peripheral devices, the network interface or other peripheral interfaces, such as input/output devices 218. In some implementations, the I/O interface 210 may perform any necessary protocol, timing or other data transformations to convert data signals from one component (e.g., non-transitory computer readable media 220) into a format suitable for use by another component (e.g., processor(s) 202). In some implementations, the I/O interface 210 may include support for devices attached through various types of peripheral buses, such as a variant of the Peripheral Component Interconnect (PCI) bus standard or the Universal Serial Bus (USB) standard, for example. In some implementations, the function of the I/O interface 210 may be split into two or more separate components, such as a north bridge and a south bridge, for example. Also, in some implementations, some or all of the functionality of the I/O interface 210, such as an interface to the non-transitory computer readable media 220, may be incorporated directly into the processor(s) 202.

The propeller motor(s) controller 204 communicates with the navigation system 208 and adjusts the power of each propeller motor to guide the UAV along a determined flight path. The power supply module 206 may control the charging and any switching functions associated with one or more power modules (e.g., batteries) of the UAV.

The navigation system 208 may include a GPS or other similar system that can be used to navigate the UAV to and/or from a location. The inventory engagement mechanism controller 212 communicates with the actuator(s) or motor(s) (e.g., a servo motor) used to engage and/or disengage inventory. For example, when the UAV is positioned over a level surface at a delivery location, the inventory engagement mechanism controller 212 may provide an instruction to a motor that controls the inventory engagement mechanism to release the inventory (e.g., an item or a package).

The network interface 216, such as a transceiver, may be configured to allow data to be exchanged between the UAV architecture 200, other devices attached to a network, such as other computer systems, and/or with UAV control systems of other UAVs. For example, the network interface 216 may enable wireless communication via signal sources and/or directly with other UAVs. In various implementations, the network interface 216 may support communication via wireless general data networks, such as a Wi-Fi network. For example, the network interface 216 may support communication via telecommunications networks such as cellular communication networks, satellite networks, and the like.

Input/output devices 218 may, in some implementations, include image capture devices, infrared sensors, time of flight sensors, accelerometers, lights, speakers, and other input/output devices commonly used in aviation. Multiple input/output devices 218 may be present and controlled by the UAV architecture 200. One or more of these sensors may be utilized to assist in landings as well as avoiding obstacles during flight.

In some embodiments, the computer readable media 220 may store a flight plan module 222, a flight controller 224, a signal source analyzer 226, and a UAV communication module, which are described in turn. The components may be stored together or in a distributed arrangement. The computer readable memory may also store data 230, such as a flight plan, signal source data, waypoints, predetermined landing sites, a weather forecast, and other data.

The flight plan module 222 may receive, maintain, update, and/or create a flight plan for use by the UAV, implemented by the flight controller 224 and navigation system. The flight plan module 222 may receive inputs from the signal source analyzer 226 and may update the flight plan (or create a new one) accordingly, which may include different waypoints and/or other different navigational information.

The flight controller 224 may implement the flight plan as well as control the UAV in accordance with the navigation system 208. The flight controller 224 may make changes in a direction or conduct of flight based on the information from the signal source analyzer 226 without necessarily receiving a change in the flight plan.

The signal source analyzer 226 may detect signal sources accessible via the network interface 216 (e.g., a transceiver). For example, as the UAV executes a flight plan and traverses over land, different signal sources may be detected and may be available for use in exchanging information between the UAV and other devices, such as the service provider 110. The signal source analyzer 226 may access signal sources data, and may create, modify, or otherwise interact with the signal source data. The signal source data may include information about known signal sources. In some embodiments, the signal source data may include a whitelist of signal sources that are trusted for use by the UAV. However, the signal source data may include information for signal sources that are not trusted or not yet trusted, such as newly discovered signal sources. In some embodiments, the signal source analyzer 226 may determine attributes of detected signal sources, including a location (or coordinates), a signal or network type, a signal strength, an authentication status, and/or other information. The signal source analyzer 226 may determine whether the detected signal source is trusted based on the signal source data from the data 230. In some embodiments, the signal source analyzer 226 may apply rules, as discussed herein, to determine how to designate a trust (or non-trust) of a detected signal source. The signal source analyzer 226 may provide information to the UAV communication module 228, which may instruct the UAV communication module 228 or cause the UAV communication module 228 to limit or refrain from communicating with untrusted signal sources.

The UAV communication module 228 may perform communications operations in accordance with information from the signal source analyzer 226. When the UAV communication module 228 receives information from the signal source analyzer 126 that a signal source is untrusted, the UAV communication module 228 may refrain from communicating with the signal source or may limit communication to certain types of communications. The UAV communication module 228 may select signal sources to communicate with (e.g., such as with 2G and 3G networks), report signal source available for communication (e.g., such as with 4G networks), and/or receive information from various signal sources, which may be provided to the signal source analyzer 226, and possibly used to populate attributes of the signal sources.

The data 230 may include the signal source data, which may be all of or a portion of data included in a signal source data repository created and/or maintained at least in part by a service provider. The data 230 may include a whitelist (which may be included in the signal source data) that designates trusted signal sources.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Additional information about the operations of the modules of the UAV 104 is discussed below with reference to the flow diagrams.

Figure 3:
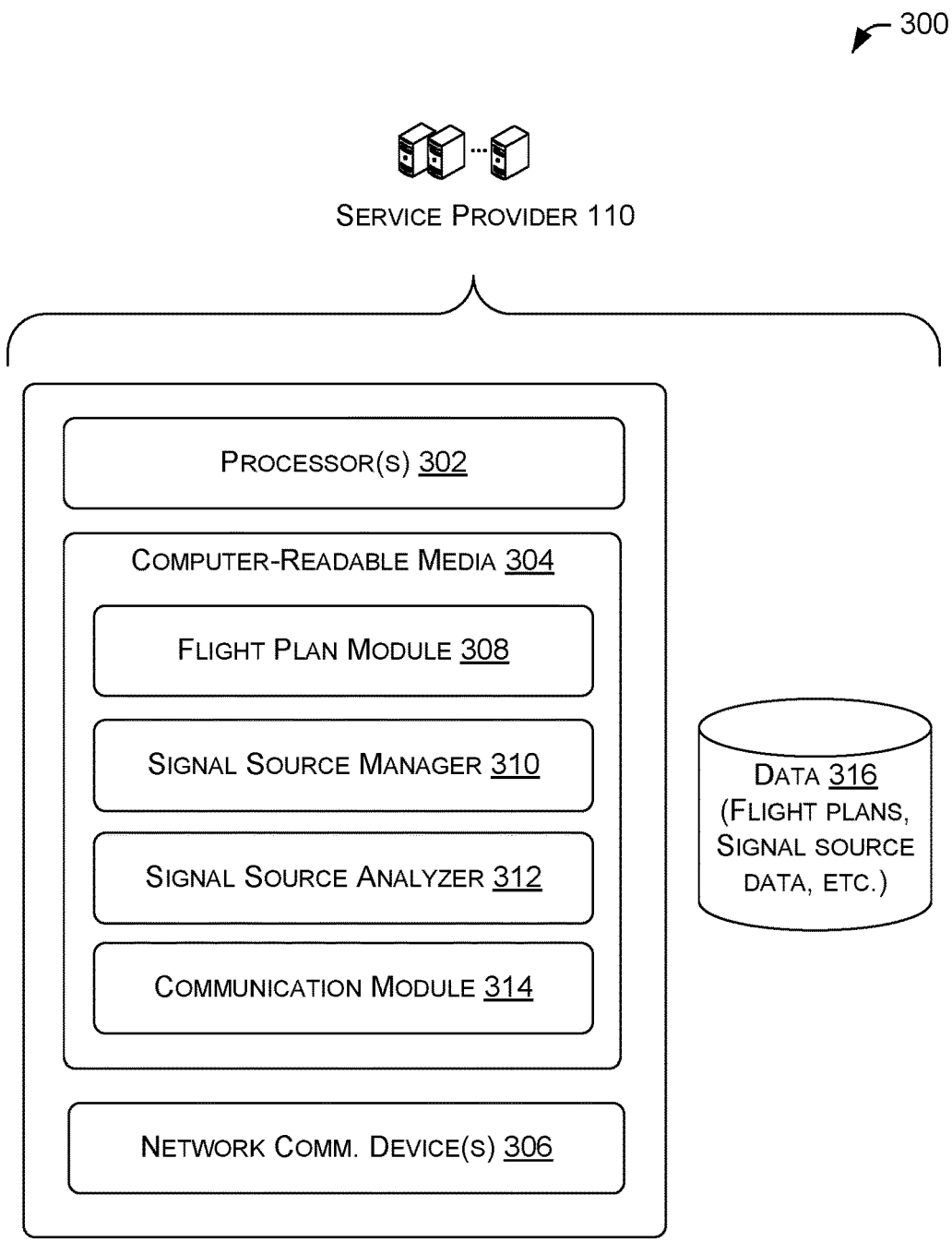
FIG. 3 is a block diagram of an illustrative computing architecture of a service provider that exchanges communications with the UAV shown in FIG. 2.

FIG. 3 is a block diagram of an illustrative computing architecture 300 of the service provider that exchanges communications with the UAV 104. The computing architecture 300 may include one or more processors 302 and one or more computer readable media 304 that stores various modules, applications, programs, or other data. The computer-readable media 304 may include instructions that, when executed by the one or more processors 302, cause the processors to perform the operations described herein for the service provider 110. The architecture 300 may also include network communication devices 306 to facilitate communication with other devices, including the UAV 104, such as using wireless networks via at least some of the signal sources discussed herein.

Embodiments may be provided as one or more a computer programs including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store a flight plan module 308, a signal source manager 310, a signal source analyzer 312, and a communication module 314, which are described in turn. The components may be stored together or in a distributed arrangement. The computer-readable media 302 may also include or have access to data 316. The data 316 may include at least the flight plan and signal source data, such as a signal source data repository.

The flight plan module 308 may determine flight plans (including specific flight paths for aerial travel by a UAV) for UAVs to perform the operations described herein, including surveying or otherwise interacting with signal sources and/or performing deliveries of items at destinations. In some embodiments, the flight plan module 308 may use data from the signal source data repository to determine flight paths, such as to select flight paths with trusted signal sources, inspect areas of a region that have not been recently surveyed, inspect a new and untrusted signal source to determine operational status, and/or for other reasons. The flight plan module 308 may update a flight plan and/or a flight path after deployment of a UAV, possibly based on information received from the UAV. However, some deviations of the flight plan may be determined by the UAV via the flight plan module 222 that is local to the UAV. The flight plan module 222 may interact with the flight plan module 308.

The signal source manager 310 may create, access, modify, or otherwise manage information in the data 230 pertaining to the signal source data repository, possibly based on information from the signal source analyzer 226 and/or the signal source analyzer 312 (discussed below). In some embodiments, the signal source manager 310 may receive information, such as whitelists and/or network tower information from trusted partners and/or entities, such as network providers. The signal source manager 310 may label or designate sources as trusted, untrusted, or unknown, among other possible labels/designations, such as by applying a ruleset as discussed herein. The signal source manager 310 may provide signal source data, such as the signal source data 120 shown in FIG. 1, for use by a UAV during a flight. This signal source data may include a subset of all the signal source data and may include information and trust designations for signal sources that are likely to be encountered during flight of the UAV.

The signal source analyzer 312 may communicate with the UAV and may receive information from the signal source analyzer 226. The signal source analyzer 312 may detect signal sources from data received by the UAV and make decisions to inform actions by the signal source analyzer 226 onboard the UAV. In some embodiments, the signal source analyzer 312 may determine attributes of detected signal sources, including a location (or coordinates), a signal or network type, a signal strength, an authentication status, and/or other information. The signal source analyzer 312 may determine whether the detected signal source is trusted based on the signal source data from the data 316 and/or data received from the signal source analyzer 226. In some embodiments, the signal source analyzer 226 may apply rules, as discussed herein, to determine how to designate a trust (or non-trust) of a detected signal source. The signal source analyzer 226 may provide information to UAV communication module 314, which may communicate this information to the UAV, and possibly to the signal source analyzer 226 via the UAV communication module 228. The signal source analyzer 312 may cause the UAV communication module 228 to limit or refrain from communicating with untrusted signal sources.

The communication module 254 may facilitate communications between UAVs, entities associated with signal sources, and possibly with devices associated with customers.

Additional information about the operations of the modules of the service provider 110 is discussed below with reference to the flow diagrams.

FIGS. 4-8 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

Figure 4:
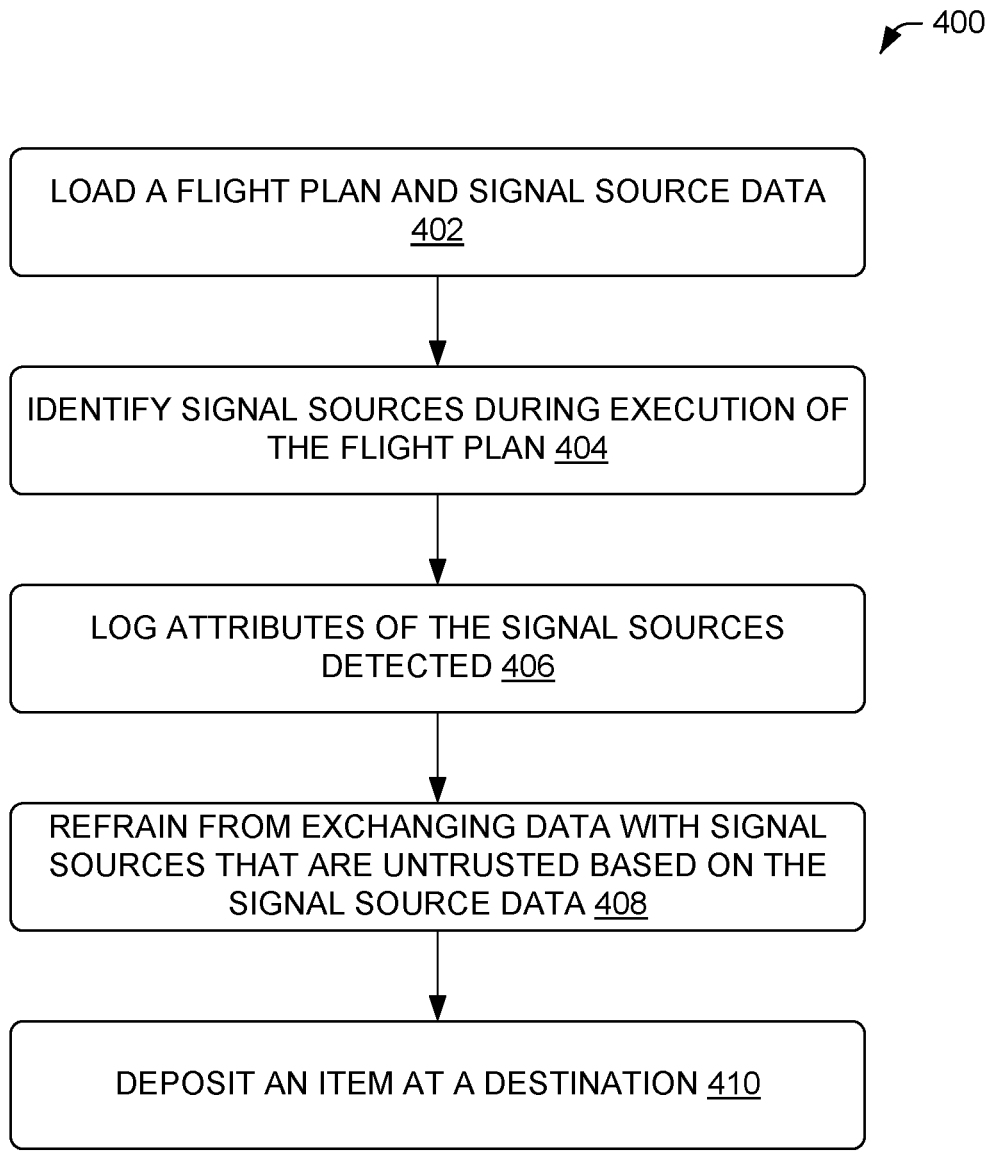
FIG. 4 is a flow diagram of an illustrative process to interact with and log attributes of signal sources while executing a flight plan to deposit an item at a destination.

FIG. 4 is a flow diagram of an illustrative process 400 to interact with and log attributes of signal sources while executing a flight plan to deposit an item at a destination. The process 400 is described with reference to at least the environment 100 and the architectures 200 and 300.

At 402, the UAV 104 may load a flight plan and signal source data for use during a flight. The UAV 104 may receive flight plan from the flight plan module 308 of the service provider (e.g., a central command). The signal source data may be at least portion of data from a signal source data repository, which may be managed by the signal source manager 310 and stored in the data 316 associated with the service provider 110. The UAV 104 may also receive an item or package to deliver to a destination.

At 404, the UAV 104 may identify signal sources during execution of the flight plan or deviation of the flight plan, which may be specific flight paths. For example, a signal source analyzer 226 may receive data about a signal source available for communication by the network interface 216 of the UAV 104.

At 406, the UAV 104 may log or otherwise store attributes, at least temporarily (e.g., in memory, in cache, etc.), of the signal sources detected at the operation 404. The attributes may include a location of a signal source (e.g., coordinates such at latitude/longitude, etc.), signal or network type, signal strength, authentication information, and/or other information. The attributes may be used to associate the signal source with a known signal source stored in the signal source data of the data 230 and/or in the signal source data repository of the data 316. In some embodiments, the signal source analyzer may determine a signal source is untrusted based on the association or on other information, such as when the signal source is newly discovered and does not include information in the data 230 and/or in the data 316.

At 408, the UAV 104 may refrain, at least during the flight plan, from exchanging data with signal sources that are untrusted based on the signal source data available to the UAV 104. The UAV 104 may refrain from selecting an untrusted signal source for communication, may refrain from reporting availability of an untrusted signal source as a candidate for network connection, and/or may refrain from exchanging data for a predetermined period of time (e.g., perform timeout).

At 410, the UAV 104 may deposit an item at a destination. For example, the UAV may deposit an item (or package) loaded on the UAV at the operation 402 when the UAV is used for delivery purposes.

Figure 5:
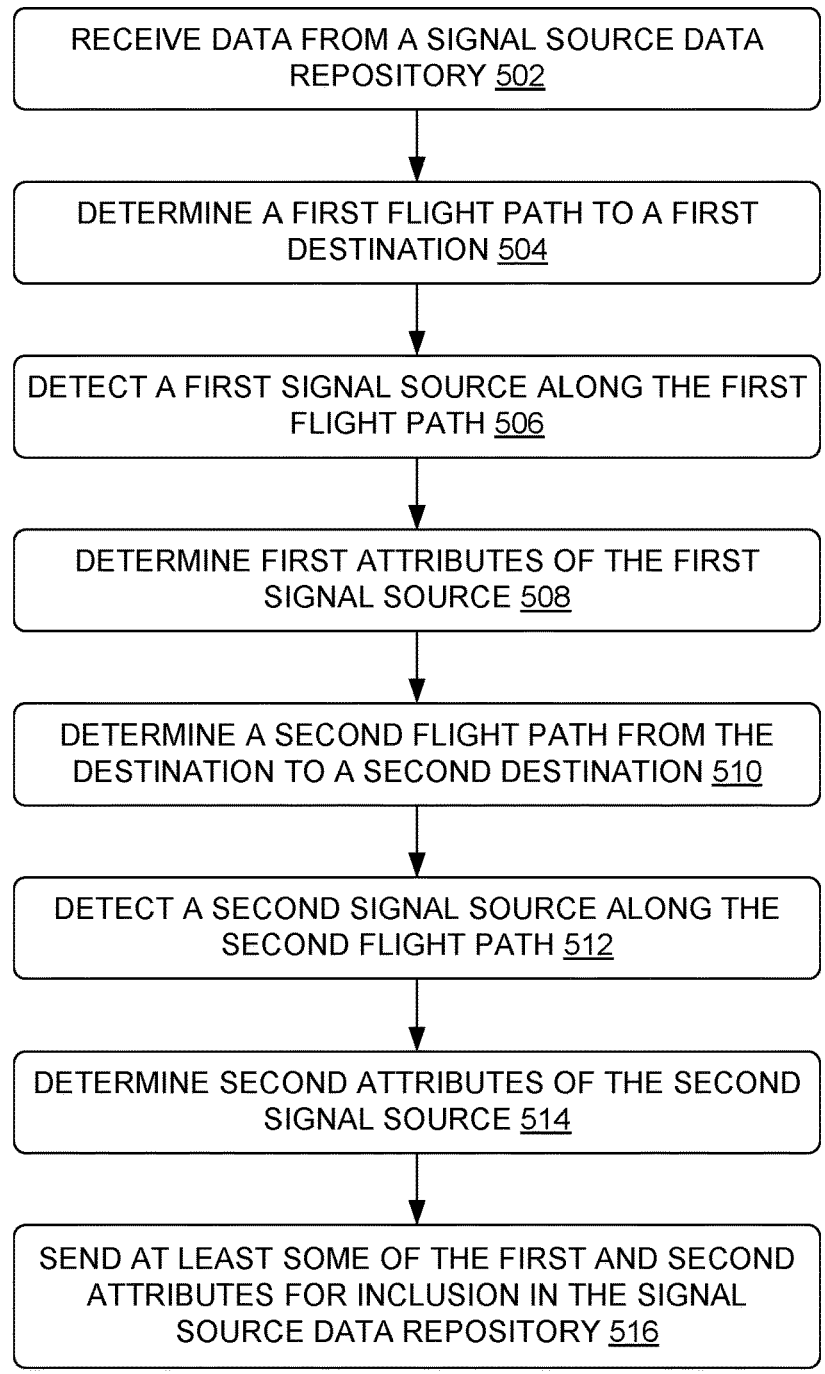
FIG. 5 is a flow diagram of an illustrative process to determine different flight paths to interact with and log attributes of different signal sources while executing the different flight paths.

FIG. 5 is a flow diagram of an illustrative process 500 to determine different flight paths to interact with and log attributes of different signal sources while executing the different flight paths. The process 500 is described with reference to at least the environment 100 and the architectures 200 and 300. The process 500 may be performed by the UAV 104, by the service provider 110, or by a combination of both.

At 502, data may be received from a signal source data repository that includes information about signal sources in a region. The information may include at least a trust designator indicating signal sources that can be used to exchange information with an entity.

At 504, a first flight path may be determined for the UAV 104 to cause the UAV to travel to a first destination. The first flight path may be determined based in part on the data received at the operation 502, such as based on locations of known signal sources having certain attributes (e.g., trust designations, locations, etc.). The first flight path may further consider power constraints of the UAV, weather conditions, air traffic, and/or other data.

At 506, a first signal source may be detected along the first flight path. For example, a network interface 216 of the UAV may access signal information from the first signal source. In some embodiments, this information may be transmitted to the service provider for remote analysis and/or may be analyzed by the UAV.

At 508, the first attributes of the first signal source may be determined. The first attributes may include at least a first location, first signal metadata, a first signal strength, and a first trust designation. The signal metadata may include a frequency, a channel, a radio access technology (RAT) designation, identification parameter(s), and/or other information received from the signal source. If the first signal source is previously unknown, the attributes may be determined based on the detecting the first signal source at the operation 506 and associated data (e.g., location information, parameters, signal metadata, etc.). When the first signal source is previously unknown, the first trust designation may be designated as untrusted. If the first signal source is previously known, and has associated data stored in the data 230 and/or the data 316, then respective data may be associated with the signal source, possibly including a trust designation.

At 510, a second flight path from the destination to a second destination may be determined. The second flight path may be part of the flight plan. The second flight path may be different than the first flight plan from the operation 504, which may enable detection of different signal sources during execution of the second flight path. Thus, the second flight path traversing different geography than the first flight path.

At 512, a second signal source may be detected along the second flight path. For example, a network interface 216 of the UAV may access signal information from the second signal source. In some embodiments, this information may be transmitted to the service provider for remote analysis and/or may be analyzed by the UAV.

At 514, second attributes of the second signal source may be determined. The second attributes may include at least a second location, second signal metadata, a second signal strength, and a second trust designation. If the second signal source is previously unknown, the second attributes may be determined based on the detecting the second signal source at the operation 512 and associated data (e.g., location information, parameters, signal metadata, etc.). When the second signal source is previously unknown, the second trust designation may be designated as untrusted. If the second signal source is previously known, and has associated data stored in the data 230 and/or the data 316, then respective data may be associated with the signal source, possibly including a trust designation.

At 516, the first attributes of the first signal source and second attributes of the second signal source (or a portion of the first and second attributes) may be sent for inclusion in the signal source data of the data 230 or the signal source data repository of the data 316. For example, the UAV 104 may send the first and second attributes (or a portion of the first and second attributes) to the service provider 110 or the service provider 110 may store the first and second attributes (or a portion of the first and second attributes) in the signal source data repository (e.g., the data 316).

Figure 6:
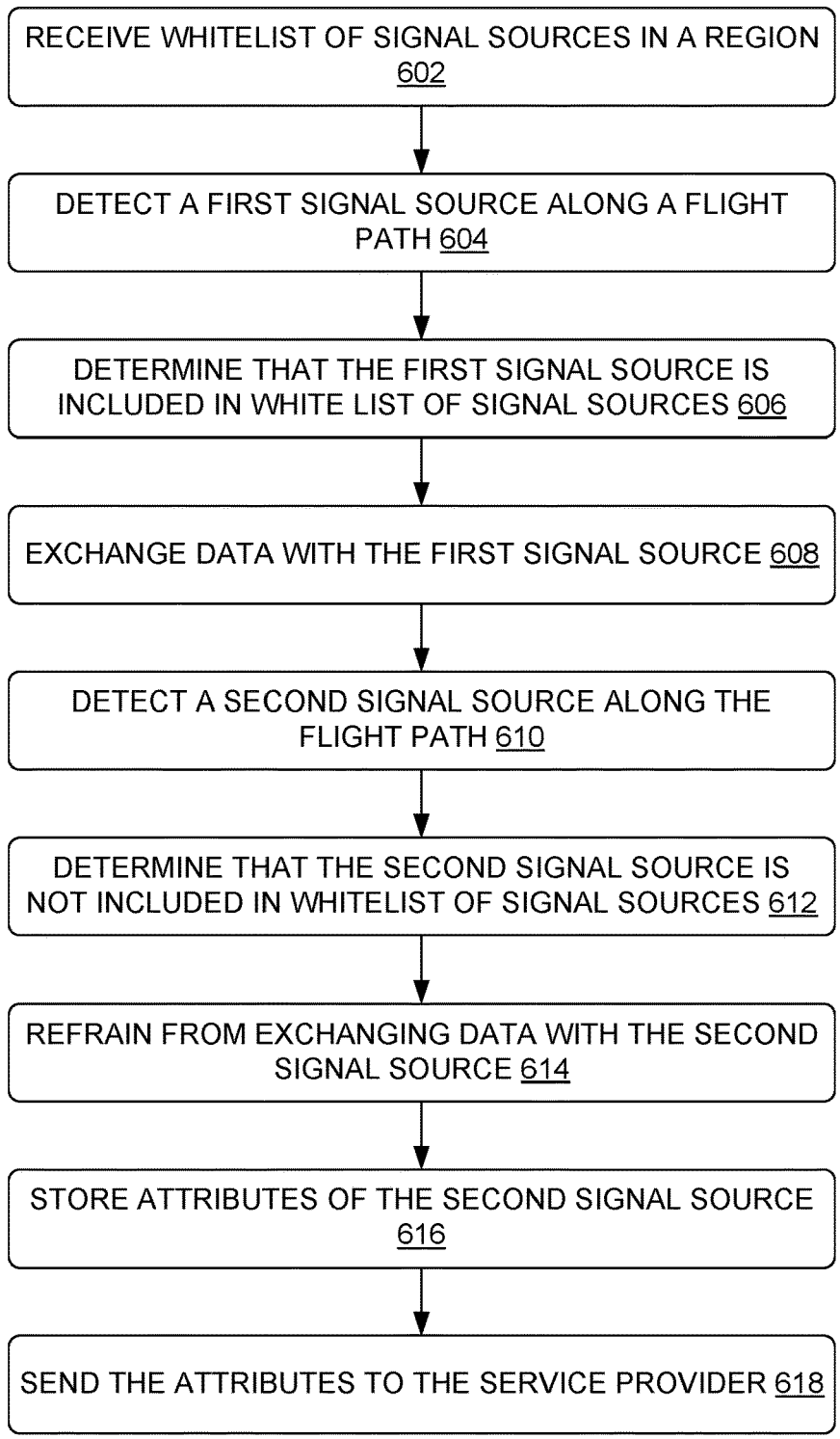
FIG. 6 is a flow diagram of an illustrative process to compare signal sources with a whitelist to determine whether signal sources are trusted signal sources and can be used to exchange data with at least a service provider.

FIG. 6 is a flow diagram of an illustrative process 600 to compare signal sources with a whitelist to determine whether signal sources are trusted signal sources and can be used to exchange data with at least a service provider. The process 600 is described with reference to at least the environment 100 and the architectures 200 and 300.

At 602, a whitelist of signal sources in a region may be received such as by the service provider 110, the UAV 104, or both. The white list may indicate that the signal sources included in the white list are trusted for initiating exchange of data with respective signal sources. The whitelist may be received from a trusted party, such as a network operator. In some embodiments the whitelist may be aggregated from multiple sources.

At 604, the first signal source along a flight path may be detected via a first transceiver. The flight path may be determined by the flight plan module 222 that cause input to the flight controller 224.

At 606, the first signal source may be determined to be included in the white list of signal sources. For example, information about the first signal source may be referenced against information in the whitelist to determine that the first signal source is included in the whitelist.

At 608, the transceiver may exchange data with the first signal source that is trusted. For example, the UAV communication module 228 may permit the transceiver to exchange data via the first signal source.

At 610, a second signal source along the flight path may be detected by the transceiver. The flight path may be determined by the flight plan module 222 that cause input to the flight controller 224.

At 612, the second signal source may be determined to not be included in the whitelist of signal sources. For example, information about the second signal source may be referenced against information in the whitelist to determine that the second signal source is not included in the whitelist.

At 614, the transceiver may refrain from exchanging data with the second signal source. For example, the UAV communication module 228 may cause the transceiver to refrain from transmitting data and/or receiving additional data from the second signal source, possibly using techniques discussed below with reference to FIG. 8.

At 616, the attributes of the second signal source may be stored for later use. For example, the attributes may include at least a location, signal metadata, and a signal strength.

At 618, the attributes of the second signal source may be sent to the service provider. The attributes may be sent for inclusion in the signal source data repository of the data 316.

Figure 7:
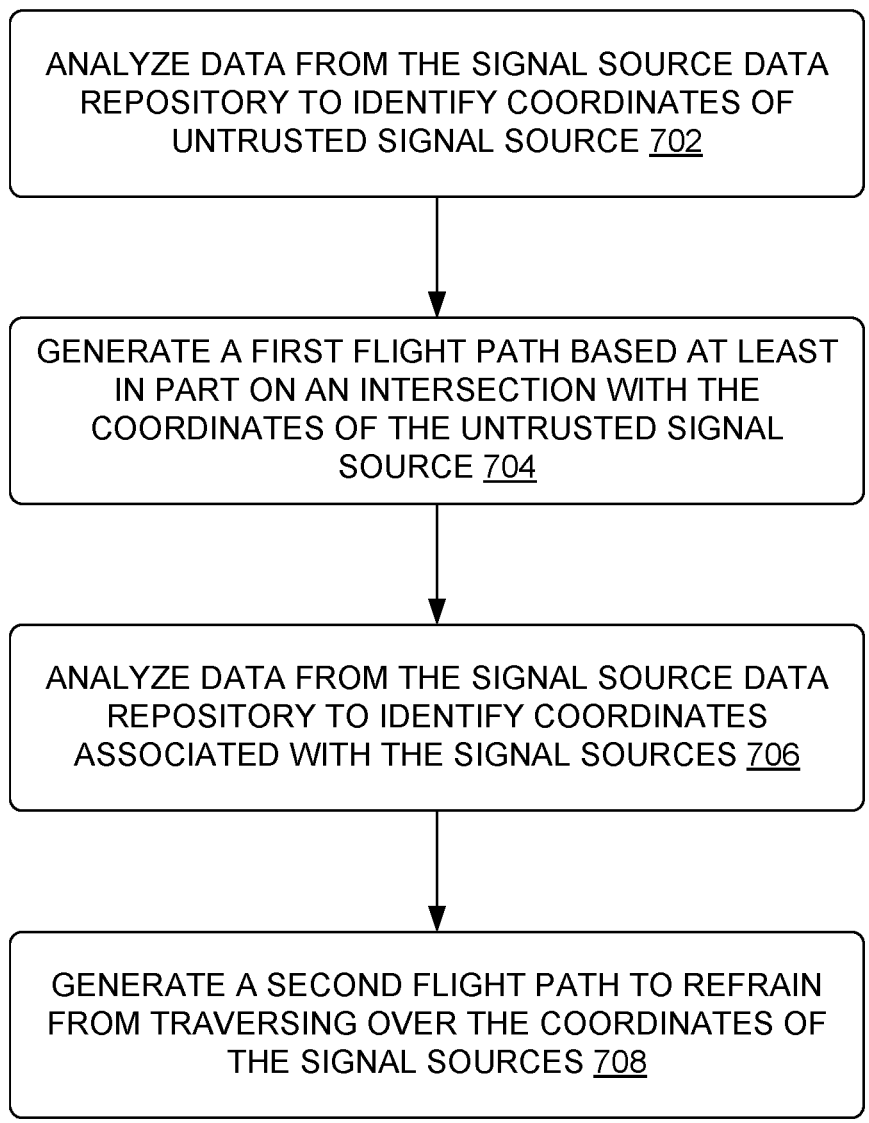
FIG. 7 is a flow diagram of an illustrative process to generate different flight paths based on data stored in a signal source data repository.

FIG. 7 is a flow diagram of an illustrative process 700 to generate different flight paths based on data stored in a signal source data repository. The process 700 is described with reference to at least the environment 100 and the architectures 200 and 300.

At 702, data from the signal source data or the signal source data repository may be analyzed to identify coordinates of untrusted signal source. For example, an untrusted signal source may be located in region of travel of a UAV or along a candidate flight path for the UAV.

At 704, a first flight path may be generated for execution by the UAV based at least in part on an intersection with the coordinates of the untrusted signal source. For example, the UAV may travel to the untrusted signal source to intentionally intercept a signal from the untrusted source, such as to monitor continued existence of the untrusted source and/or determine whether attributes have changed since a prior analysis of the untrusted signal source.

At 706, data from the signal source data or the signal source data repository may be analyzed to identify coordinates associated with the signal sources. For example, a UAV may determine where known signal sources have been detected in a region by prior surveys or interactions with UAVs during prior flights.

At 708, a second flight path may be generated to refrain from traversing over the coordinates of the known signal sources and/or over same locations as prior flights in order to capture new information and attributes about signal source, including known signal sources and/or previously unknown signal sources. For example, the UAV may detect a signal strength at different coordinates for a known signal source.

In some embodiments, the processes 700 may execute operations 702 and 704 without executing operations 706 and 708, or vice versa.

Figure 8:
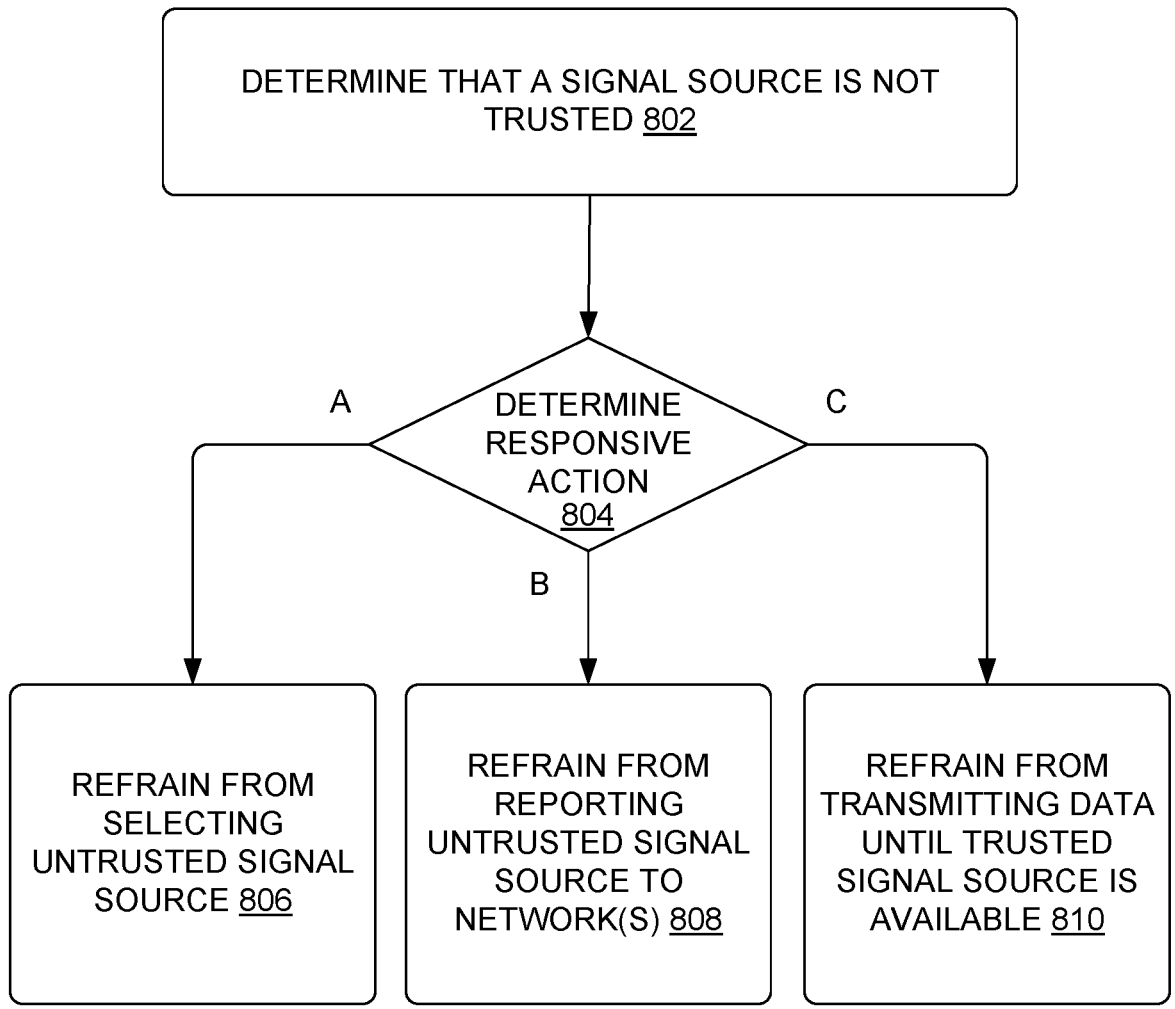
FIG. 8 is a flow diagram of an illustrative process to determine responsive actions in response to encountering an untrusted signal source.

FIG. 8 is a flow diagram of an illustrative process 800 to determine responsive actions in response to encountering an untrusted signal source. The process 800 is described with reference to at least the environment 100 and the architectures 200 and 300.

At 802, a signal source may be determined to not be trusted (e.g., via lack of inclusion in a whitelist, etc.) or may be determined to be designated as untrusted (e.g., via a blacklist, etc.). The signal source may be newly discovered and not be associated with prior information, and thus designated as not trusted. At least some attributes of the signal source may be determined, such as signal metadata of the signal.

At 804, a responsive action may be determined to avoid communicating or exchanging data via the signal source that is not trusted. The decision at the decision operation 804 may be based on attributes of the signal source, and possibly based on other information about the signal source, the UAV, the availability of other signal source, and/or other information.

Following a first route "A" from the decision operation 804, an operation 806 may be performed. At 806, the UAV communication module 228 may cause a transceiver (or a network interface) to refrain from connecting to the signal source or exchanging data with the signal source. For example, the operation 806 may be performed when the signal source is identified as a 2G network or a 3G network.

Following a first route "B" from the decision operation 804, an operation 808 may be performed. At 808, the UAV communication module 228 may cause the transceiver (or the network interface) to refrain from reporting the signal source as available or detected by the transceiver. By not reporting the known existence of the signal source, the transceiver may avoid exchanging certain data with the signal source when the signal source may be selected for the communication for the transceiver, such as using protocols typical of 4G networks. For example, the operation 808 may be performed when the signal source or other available signal sources are identified as a 4G network.

Following a first route "C" from the decision operation 804, an operation 810 may be performed. At 810, the UAV communication module 228 may cause the transceiver (or the network interface) to refrain from transmitting information and/or receiving information until a trusted signal source is available and/or until the signal source that is not trusted as determined at the operation 802 is out of range for communication. For example, the UAV communication module 228 pause, deactivate or otherwise temporarily terminate normal operation of the transceiver or network interface. In some embodiments, the flight controller 224 may cause the UAV to fly away from the untrusted signal source to access other signal sources, where the flight may include at least some segments without connectivity to external sources, such as the service provider 110.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
 determining a flight plan for an unmanned aerial vehicle (UAV) to traverse along a route;
 causing deployment of the UAV pursuant to the flight plan;
 detecting, based at least in part on the UAV surveying one or more signal sources during execution of the flight plan along the route, a first signal source at a first location;
 comparing the first signal source to signal source data to determine whether the first signal source is designated as a trusted source or an untrusted source;
 determining that the first signal source is designated as the trusted source;
 sending, to the UAV, a first instruction to cause a transceiver of the UAV to exchange data with the first signal source;
 detecting, based at least in part on the UAV surveying the one or more signal sources during the execution of the flight plan along the route, a second signal source at a second location, the second signal source previously determined to be the untrusted source;
 comparing currently detected attributes of the second signal source to previously detected attributes of second signal source in the signal source data to determine whether the second signal source is now designated as the trusted source or whether the second signal source continues to be designated as the untrusted source, the currently detected attributes being determined a predetermined amount of time after which the previously detected attributes were determined;
 determining that the second signal source continues to be designated as the untrusted source; and
 sending, to the UAV, a second instruction to cause the transceiver to refrain from exchanging data with the second signal source.

2. The method as recited in claim 1, wherein the comparing the first signal source to signal source data includes:
 comparing the first signal source to an approved list of trusted signal sources; and
 comparing the first signal source to an unapproved list of untrusted signal sources.

3. The method as recited in claim 1, further comprising, in response to determining that the second signal source is designated as the untrusted source, sending, to the UAV, a third instruction to cause the UAV to perform a flight operation to fly toward a known location of the first signal source.

4. The method as recited in claim 1, wherein to cause the transceiver to refrain from exchanging data with the second signal source includes refraining from selecting the second signal source.

5. The method as recited in claim 1, wherein to cause the transceiver to refrain from exchanging data with the second signal source includes refraining from reporting the second signal source as available for connection.

6. The method as recited in claim 1, wherein the determining that the second signal source is designated as the untrusted source includes failing to identify the second signal source as the trusted source, and further comprising storing attributes of the second signal source including at least a location, signal metadata, and a signal strength.

7. The method as recited in claim 1, further comprising:
 determining one or more previously identified untrusted signal sources; and
 identifying the flight plan and the route to determine whether the one or more previously identified untrusted signal sources remain present and active.

8. The method as recited in claim 1, further comprising:
 determining a first area that has yet to be surveyed by one or more UAVs or a second area that has not been surveyed for a predetermined amount of time; and
 generating the flight plan based at least in part on the first area or the second area.

9. The method as recited in claim 1, further comprising determining, based at least in part on the second signal source being designated as the untrusted source, a second flight plan for the UAV to traverse along a second route that avoids the second location, the second flight plan being different than the flight plan and the second route being different than the route.

10. A system comprising:
 one or more processors; and
 one or more computer-executable instructions that, when executed by the one or more processors, cause the one or more processors to perform operations comprising:
  determining a flight plan for an unmanned aerial vehicle (UAV) to traverse along a route;
  detecting, based at least in part on the UAV surveying one or more signal sources during execution of the flight plan along the route, a first signal source at a first location, the first signal source previously determined to be an untrusted source;
  comparing currently detected attributes of the first signal source to previously detected attributes of the first signal source in signal source data to determine whether the first signal source is now designated as a trusted source or whether the first signal source continues to be designated as the untrusted source, the currently detected attributes being determined a predetermined amount of time after which the previously detected attributes were determined;
  determining that the first signal source is now designated as the trusted source;
  causing a transceiver of the UAV to exchange data with the first signal source;
  detecting a second signal source at a second location;
  comparing the second signal source to the signal source data to determine whether the second signal source is designated as the trusted source or the untrusted source;
  determining that the second signal source is designated as the untrusted source; and
  causing the transceiver to refrain from exchanging data with the second signal source.

11. The system as recited in claim 10, wherein the comparing the first signal source to signal source data includes;
   comparing the first signal source to an approved list of trusted signal sources; and
   comparing the first signal source to an unapproved list of untrusted signal sources.

12. The system as recited in claim 10, wherein the operations further comprise, in response to determining that the second signal source is designated as the untrusted source, causing the UAV to perform a flight operation to fly toward a known location of the first signal source.

13. The system as recited in claim 10, wherein the causing the transceiver to refrain from exchanging data with the second signal source includes refraining from selecting the second signal source.

14. The system as recited in claim 10, wherein the causing the transceiver to refrain from exchanging data with the second signal source includes refraining from reporting the second signal source as available for connection.

15. The system as recited in claim 10, wherein the determining that the second signal source is designated as the untrusted source includes failing to identify the second signal source as the trusted source, and wherein the operations further comprise:
   storing attributes of the second signal source including at least a location, signal metadata, and a signal strength; and
   sending the attributes to a service provider for inclusion in the signal source data.

16. A method comprising:
   determining a flight plan for an unmanned aerial vehicle (UAV) to traverse along a route;
   determining a first signal source at a first location;
   determining that the first signal source has been active for a predetermined amount of time;
   determining, based at least in part on signal source data and the first signal source being active for the predetermined amount of time, that the first signal source is designated as a trusted source;
   causing data to be exchanged with the first signal source;
   determining, based at least in part on the UAV surveying one or more signal sources during execution of the flight plan along the route, a second signal source at a second location;
   determining, based at least in part on the signal source data, that the second signal source is designated as an untrusted source; and
   refraining from exchanging data with the second signal source.

17. The method as recited in claim 16, wherein the signal source data is a data repository that stores information regarding signal sources in a region that includes the first location and the second location, the information including a trust designation indicating signal sources that are to be trusted for initiating exchange of data with a service provider.

18. The method as recited in claim 16, wherein the first signal source corresponds to the UAV traversing the flight plan along the route and the second signal source corresponds to a second UAV, different than the UAV, traversing a second flight plan that is different than the flight plan.

19. The method as recited in claim 16, further comprising sending, to the UAV that is currently traversing the route within a region that includes the second location and based at least in part on the second signal source being designated as the untrusted source, an instruction to traverse a second route that is different than the route.

20. The method as recited in claim 16, further comprising, in response to determining that the second signal source is designated as the untrusted source, causing the UAV to perform an operation to move toward a known location of the first signal source.

* * * * *